US012725470B2

(12) United States Patent
Nagasawa

(10) Patent No.: US 12,725,470 B2
(45) Date of Patent: Sep. 1, 2026

(54) INFORMATION PRESENTATION APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 110 days.

(21) Appl. No.: 18/889,704

(22) Filed: Sep. 19, 2024

(65) Prior Publication Data

US 2025/0111716 A1 Apr. 3, 2025

(30) Foreign Application Priority Data

Sep. 29, 2023 (JP) ................................ 2023-169356

(51) Int. Cl.

| | |
|---|---|
| ***G07C 5/08*** | (2006.01) |
| ***B60K 35/23*** | (2024.01) |
| ***B60K 35/28*** | (2024.01) |
| ***G06T 19/20*** | (2011.01) |
| ***G06V 20/56*** | (2022.01) |
| ***G09G 3/00*** | (2006.01) |

(52) U.S. Cl.

CPC ............ *G07C 5/0816* (2013.01); *B60K 35/23* (2024.01); *B60K 35/28* (2024.01); *G06T 19/20* (2013.01); *G06V 20/588* (2022.01); *G09G 3/003* (2013.01); *B60K 2360/167* (2024.01); *G06T 2219/2016* (2013.01); *G09G 2380/10* (2013.01)

(58) Field of Classification Search

None

See application file for complete search history.

(56) References Cited

U.S. PATENT DOCUMENTS

2010/0164702 A1 7/2010 Sasaki et al.
2018/0143431 A1* 5/2018 Matsuura ............... B60K 35/10
2018/0300746 A1* 10/2018 Terzian ..................... G06T 7/70
2019/0367028 A1* 12/2019 Larsson .............. B60W 30/188
2020/0180645 A1 6/2020 Itoh et al.
2021/0173093 A1* 6/2021 Redler .................. G01C 21/30

FOREIGN PATENT DOCUMENTS

JP 2010-156608 A 7/2010
JP 2020-93590 A 6/2020
JP 2021-30776 A 3/2021

* cited by examiner

*Primary Examiner* — Frank S Chen
(74) *Attorney, Agent, or Firm* — Rimon P.C.

(57) ABSTRACT

An information presentation apparatus is to be mounted on a vehicle and includes a road surface shape recognizer, a vehicle attitude predictor, and an image display. The road surface shape recognizer is configured to recognize a shape of a road surface in front of the vehicle. The vehicle attitude predictor is configured to predict an attitude that the vehicle takes when the vehicle is to pass through the shape of the road surface recognized by the road surface shape recognizer. The image display is configured to project an image of a three-dimensional object that represents the attitude of the vehicle predicted by the vehicle attitude predictor onto a front screen of the vehicle and display the image on the front screen.

17 Claims, 5 Drawing Sheets

INFORMATION PRESENTATION APPARATUS

CROSS-REFERENCE TO RELATED APPLICATIONS

The present application claims priority from Japanese Patent Application No. 2023-169356 filed on Sep. 29, 2023, the entire contents of which are hereby incorporated by reference.

BACKGROUND

The disclosure relates to an information presentation apparatus to be mounted on a vehicle such as an automobile.

For example, Japanese Unexamined Patent Application Publication (JP-A) Nos. 2010-156608, 2020-93590, and 2021-30776 each disclose a technique related to an information presentation apparatus to be mounted on a vehicle.

SUMMARY

An aspect of the disclosure provides an information presentation apparatus to be mounted on a vehicle. The information presentation apparatus includes a road surface shape recognizer, a vehicle attitude predictor, and an image display. The road surface shape recognizer is configured to recognize a shape of a road surface in front of the vehicle. The vehicle attitude predictor is configured to predict an attitude that the vehicle takes when the vehicle is to pass through the shape of the road surface recognized by the road surface shape recognizer. The image display configured to project an image of a three-dimensional object that represents the attitude of the vehicle predicted by the vehicle attitude predictor onto a front screen of the vehicle and display the image on the front screen.

An aspect of the disclosure provides an information presentation apparatus to be mounted on a vehicle. The information presentation apparatus includes a sensor, circuitry, and a projector. The sensor is configured to acquire data in front of the vehicle. The circuitry is configured to generate an image, based on the data acquired by the sensor. The projector is configured to project the image onto a front screen of the vehicle and display the image on the front screen. The circuitry is configured to: recognize a shape of a road surface in front of the vehicle, based on the data; predict an attitude that the vehicle takes when the vehicle is to pass through the shape of the road surface; generate an image of a three-dimensional object that represents the predicted attitude of the vehicle; and output the generated image to the projector.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
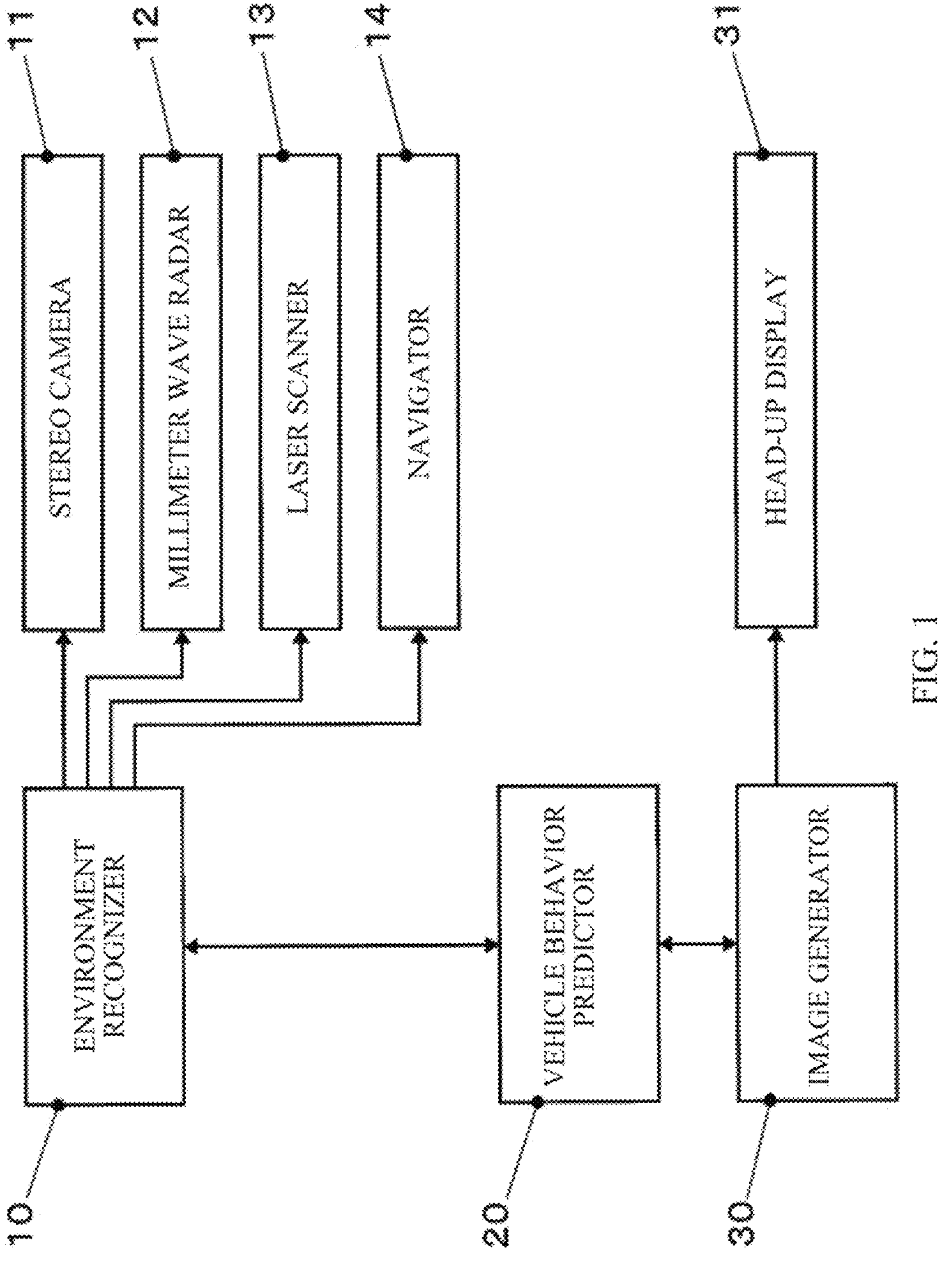
FIG. 1 is a block diagram schematically illustrating a system configuration of an information presentation apparatus according to one example embodiment of the disclosure.

JP-A No. 2010-156608 discloses a technique related to an information presentation apparatus to be mounted on a vehicle. The technique includes a picture projector and an angle data acquirer in an in-vehicle display system. The picture projector projects, toward one eye of a viewer, a luminous flux including a picture having a display object. The angle data acquirer acquires one or more of vehicle angle data and an external angle data. The vehicle angle data relates to one or more of an attitude and an azimuth of a vehicle on which the viewer rides. The external angle data relates to an angle of a background object at a position of a target of a display object in an external background of the vehicle. The picture projector changes an angle in the picture of the display object, based on one or more of the vehicle angle data and the external angle data acquired by the angle data acquirer.

JP-A No. 2020-93590 discloses a driving assist apparatus in which an ECU so output, to a display device, driving assist information that the driving assist information is projected and displayed in a region. The region is provided immediately above an accelerator pedal and a brake pedal, which are operation members provided in a vehicle, and is on a windshield within in a visual field region of a driver who drives the vehicle. The driving assist information includes an operation amount actually operated by the driver with respect to the accelerator pedal and a recommended operation amount with respect to the accelerator pedal.

The ECU so outputs, to the display device, the driving assist information that the driving assist information is projected and displayed on a line of sight of the driver between the driver and the windshield of the vehicle.

The driving assist information includes a receptor having a concave surface and having a bowl shape, and a sphere that is virtually movable on the receptor in response to a change in gravitational acceleration occurring in the front, rear, right, and left directions of the vehicle. The ECU so outputs, to the display device, the sphere as to move on the receptor, based on behavior data inputted from a behavior sensor.

JP-A No. 2021-30776 discloses a display control apparatus to be mounted on a vehicle. When the vehicle travels on a curved front road and when there is a possibility that the vehicle deviates from a traveling lane due to a limit of a lane keep control that causes the vehicle to travel within the traveling lane, the display control apparatus generates an image having deviation notification content. The deviation notification content is an image content indicating that the vehicle can deviate from the traveling lane. The image having the deviation notification content is provided to and displayed on a head-up display. The image content includes an image content indicating a steering wheel of the vehicle and an image content indicating a steering direction of the steering wheel necessary for the vehicle to travel without deviating from the traveling lane.

In rough road traveling, a driver who drives a vehicle is to understand road surface information on a road surface in front of the vehicle which can be a blind spot due to a part of a vehicle body, such as a front overhang, as viewed from the driver, and to recognize an attitude that the vehicle may possibly take in the future.

To address this, for example, information may be presented by a display such as a center display. However, in this case, the driver may possibly look at the information by shifting a line of sight from a direct visual field in front of the vehicle. Accordingly, there is a concern that a visual recognition of the direct visual field becomes sparse, for example, when the driver is to gaze and understand a situation.

What is desired is a technique that enables a driver who drives a vehicle to recognize a behavior of the vehicle that the vehicle may possibly take in the future without shifting a line of sight from a traveling environment in front of the vehicle.

It is desirable to provide an information presentation apparatus that makes it possible for an occupant to intuitively recognize an attitude that a vehicle takes in the future.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

An information presentation apparatus 1 according to an example embodiment of the disclosure may be mounted on a vehicle. In some embodiments, the vehicle may be a passenger car such as a sport utility vehicle (SUV).

FIG. 1 is a diagram schematically illustrating a system configuration of the information presentation apparatus 1 according to the example embodiment.

The information presentation apparatus 1 may have devices including, for example but not limited to, an environment recognizer 10, a vehicle behavior predictor 20, and an image generator 30.

In some embodiments, one or more processors may configure the environment recognizer 10, the vehicle behavior predictor 20, and the image generator 30.

The environment recognizer 10 may recognize an environment around a vehicle, based on various sensors. For example, the environment recognizer 10 may recognize an environment in front of the vehicle. In one embodiment, the environment recognizer may serve as a "road surface shape recognizer".

The environment recognizer 10 may be coupled to devices including, for example but not limited to, a stereo camera 11, a millimeter wave radar 12, a laser scanner 13, and a navigator 14.

In one embodiment, one or more of the stereo camera 11, the millimeter wave radar 12, the laser scanner 13, and the navigator 14 may serve as a "sensor". The sensor acquires data in front of the vehicle. One or more of the stereo camera 11, the millimeter wave radar 12, the laser scanner 13, and the navigator 14 may be coupled to the environment recognizer 10.

The stereo camera 11 may include a pair of right and left cameras that capture images of the front of the vehicle.

The right and the left cameras may be spaced apart from each other in a vehicle width direction by a predetermined baseline length.

The stereo camera 11 may perform a stereo image process on data on the images captured by the right and the left cameras and recognize a road shape in front of the vehicle. For example, the stereo camera 11 may recognize a shape of a traveling lane along which the vehicle travels.

For example, the road shape may include a curvature in a planar shape, an inclination of a road surface in a right-left direction, and an inclination in a front-rear direction of the road surface.

The millimeter wave radar 12 may be a radar that recognizes an object such as an obstacle in front of the vehicle. The millimeter wave radar 12 may recognize the object, based on an electromagnetic wave having a wavelength of about 1 mm to about 10 mm and a frequency of about 30 GHz to about 300 GHz.

The laser scanner 13 may be an area measurement sensor that recognizes an object such as the obstacle in front of the vehicle, by emitting laser light having a wavelength close to visible light and based on data on reflected light derived from the laser light. The area measurement sensor may be a light detection and ranging (LiDAR).

The millimeter wave radar 12 and the laser scanner 13 may measure a factor such as a size of the obstacle, a shape of the obstacle, a distance of the obstacle with respect to the vehicle, a speed of the vehicle with respect to the obstacle, or an angle of the obstacle with respect to the vehicle.

For example, the obstacle may include a protrusion or a fallen object present on the road surface, and a hole or a groove formed by a recessed road surface.

The navigator 14 may have devices including, for example but not limited to, a satellite positioning device and a storage medium containing high-precision three-dimensional map data. The satellite positioning device may be a global positioning system (GPS).

The navigator 14 may recognize a shape of the road around the vehicle, based on a current position of the vehicle acquired by the satellite positioning device and the high-precision three-dimensional map data.

The environment recognizer 10 three-dimensionally recognizes a shape of a road surface of a road on which the vehicle is to pass in the future, based on the pieces of data acquired from the stereo camera 11, the millimeter wave radar 12, the laser scanner 13, and the navigator 14.

The recognized road surface shape may be transmitted to the vehicle behavior predictor 20.

In one embodiment, the vehicle behavior predictor 20 may serve as a "vehicle attitude predictor". The vehicle attitude predictor predicts a vehicle body behavior of the vehicle that may possibly occur in the future, based on the road surface shape in front of the vehicle acquired from the environment recognizer 10.

For example, the vehicle body behavior may include a factor such as a pitch behavior in which the vehicle body tilts in a forward tilting direction or a backward tilting direction, a roll behavior in which the vehicle body tilts in a right-left tilting direction, or a behavior in which these factors are combined with each other.

The image generator 30 generates an image to be projected on a front screen FS, based on an output of the vehicle behavior predictor 20. The image generator 30 may output the image to a head-up display 31.

The head-up display 31 may be coupled to the image generator 30.

The head-up display 31 may be an image presentation device that projects the image onto the front screen FS of the vehicle and presents the projected image to a driver who drives the vehicle. In one embodiment, the image generator 30, the head-up display 31, or both may serve as an "image display". In some embodiments, the head-up display 31 or the image presentation device may serve as a "projector".

Figure 2:
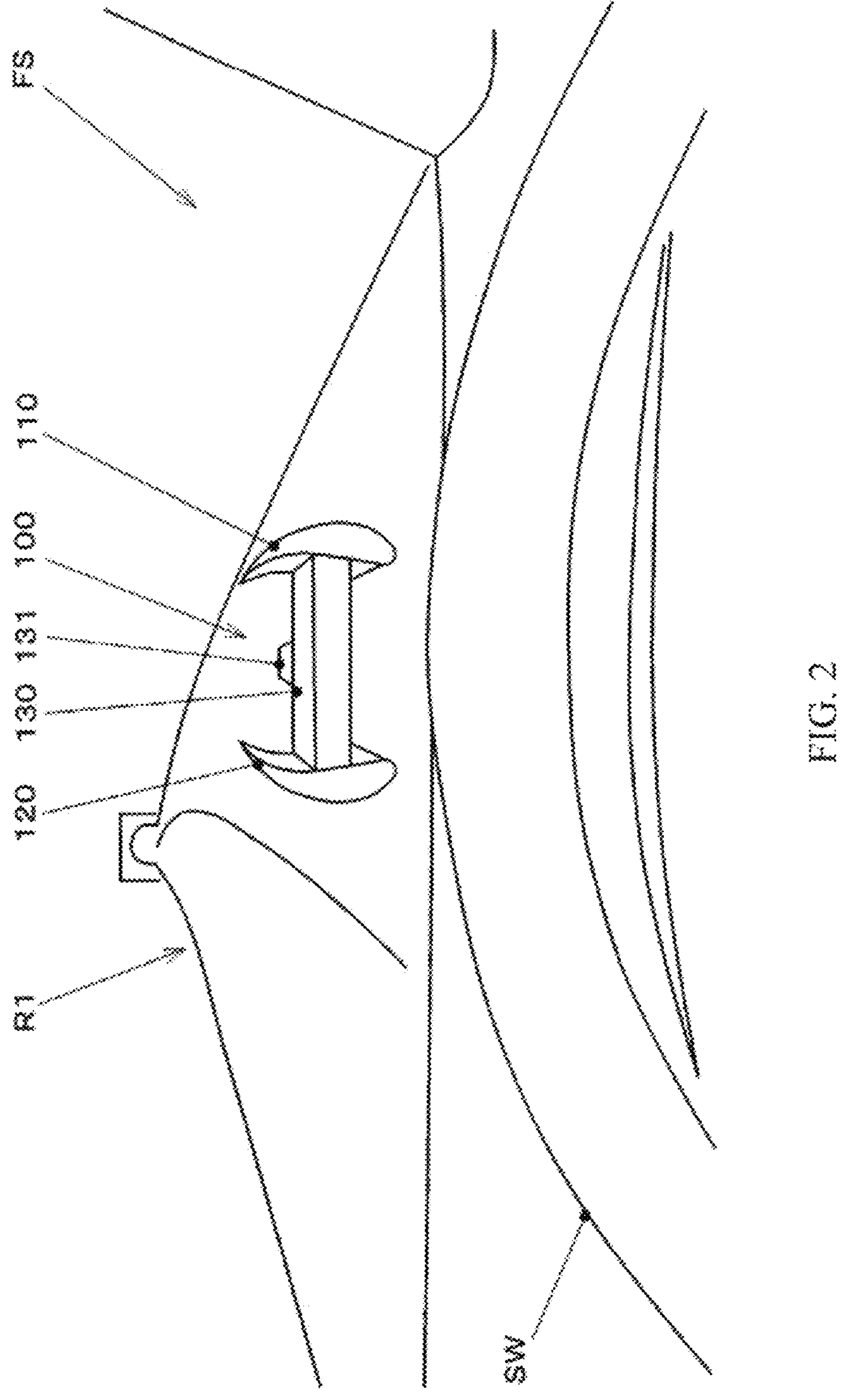
FIG. 2 is a diagram illustrating an example of a display mode of a head-up display when a vehicle travels on a flat surface.

FIG. 2 is a diagram illustrating an example of a display mode of the head-up display 31 when the vehicle travels on a flat surface.

The head-up display 31 may display an image of a three-dimensional object 100 in a region, on a front side of a steering wheel SW, on the front screen FS provided at a front part of a vehicle compartment.

In some embodiments, the three-dimensional object 100 may have a shape that simulates a shift paddle. The shift paddle may be a shift operation member for the driver to perform a shift operation.

The three-dimensional object 100 may have objects including, for example but not limited to, a right paddle 110, a left paddle 120, and a coupler 130.

The right paddle 110 may have a shape that simulates a right paddle by which the driver performs a shift-up operation with the fingers of the right hand of the driver.

The left paddle 120 may have a shape that simulates a left paddle by which the driver performs a shift-down operation with the fingers of the left hand of the driver.

The coupler 130 may be a box-shaped part that extends in the vehicle width direction and couples the right paddle 110 and the left paddle 120.

A protrusion 131 that protrudes toward a front side of the vehicle may be provided at a middle part in the vehicle width direction of the coupler 130.

In an example illustrated in FIG. 2, a road R1 in front of the vehicle may be gently curved and have a flat road surface shape.

In this case, the three-dimensional object 100 may be displayed in a horizontal state in which the right paddle 110 and the left paddle 120 are disposed at the equal height to each other and the right paddle 110 and the left paddle 120 are not inclined forward and backward.

Figure 3:
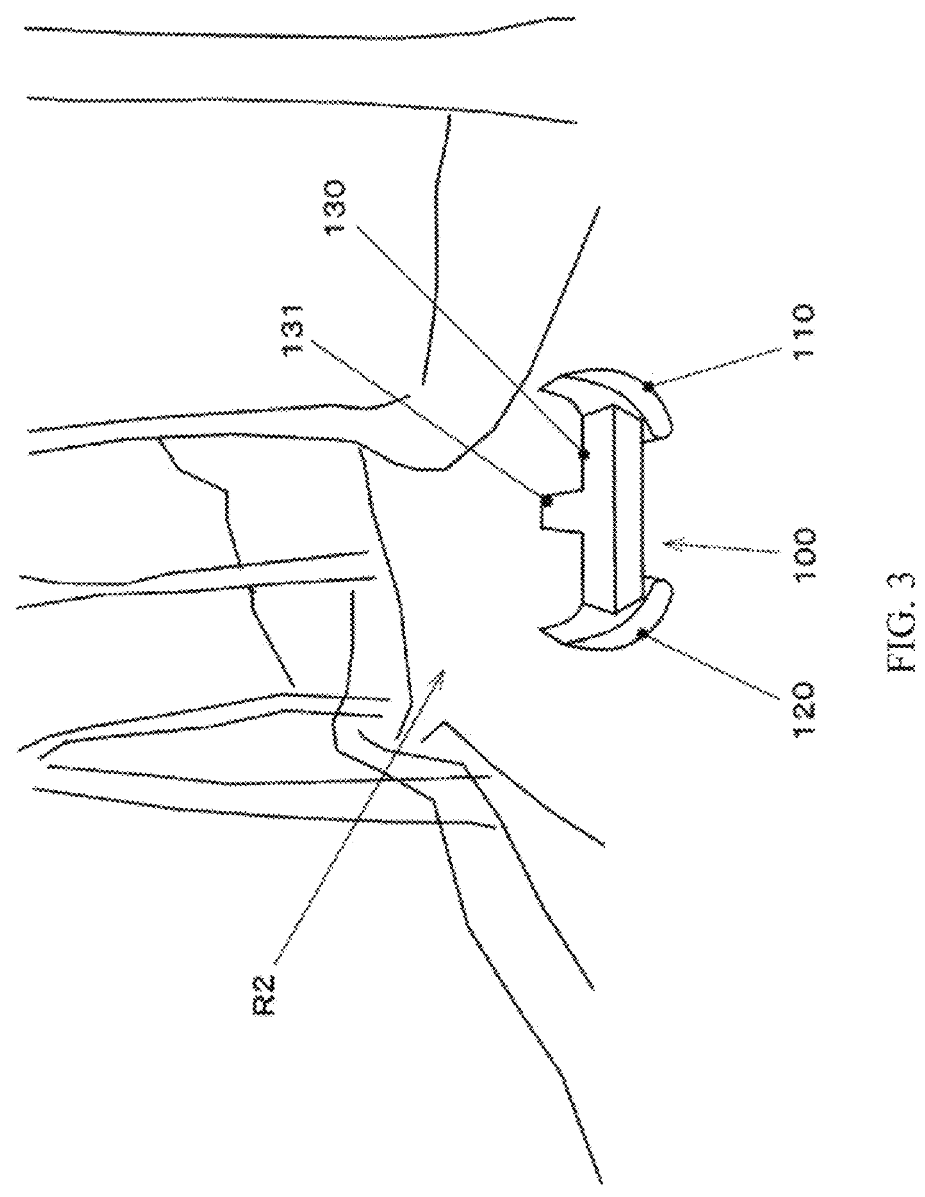
FIG. 3 is a diagram illustrating an example of a display mode of the head-up display when the vehicle travels on an uphill road.

FIG. 3 is a diagram illustrating an example of a display mode of the head-up display 31 when the vehicle travels on an uphill road.

Figure 4:
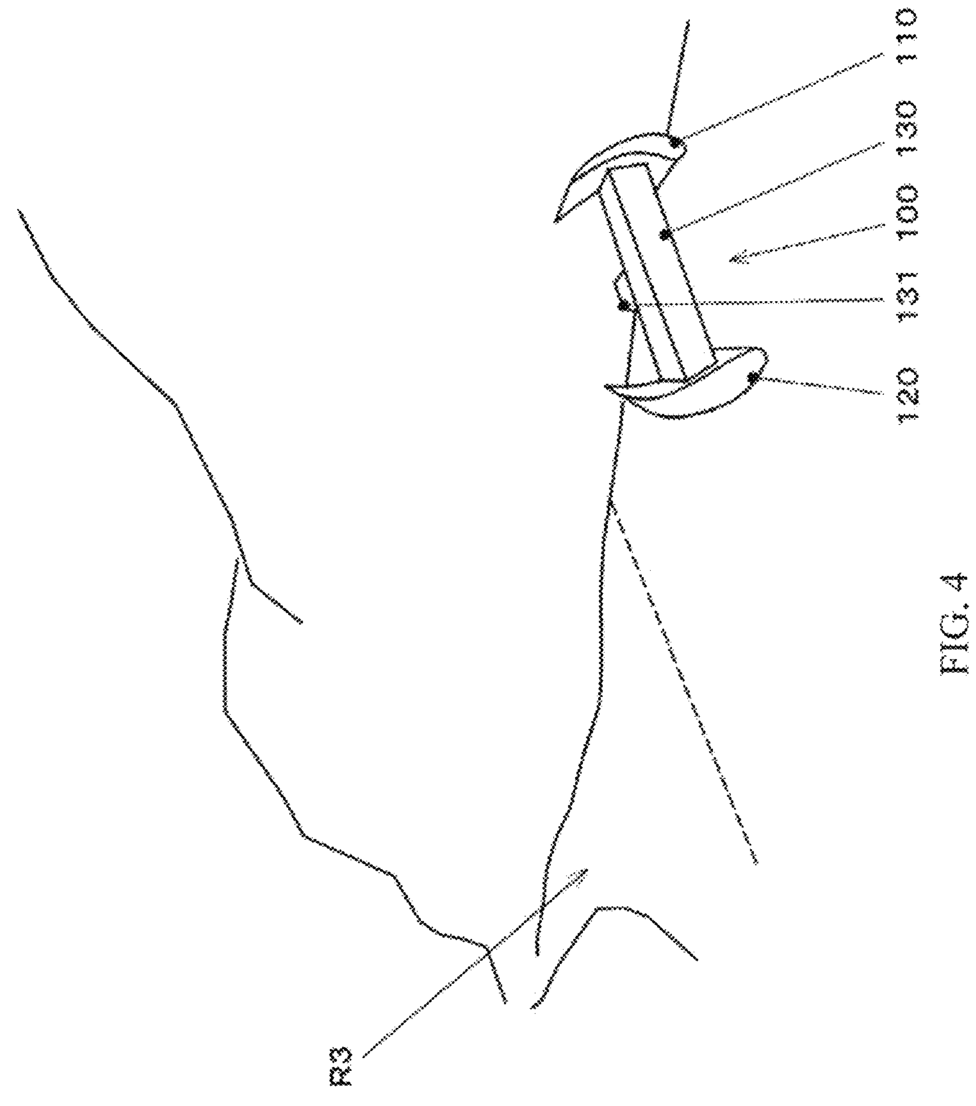
FIG. 4 is a diagram illustrating a display mode of the head-up display when the vehicle travels on a bank road.
Figure 5:
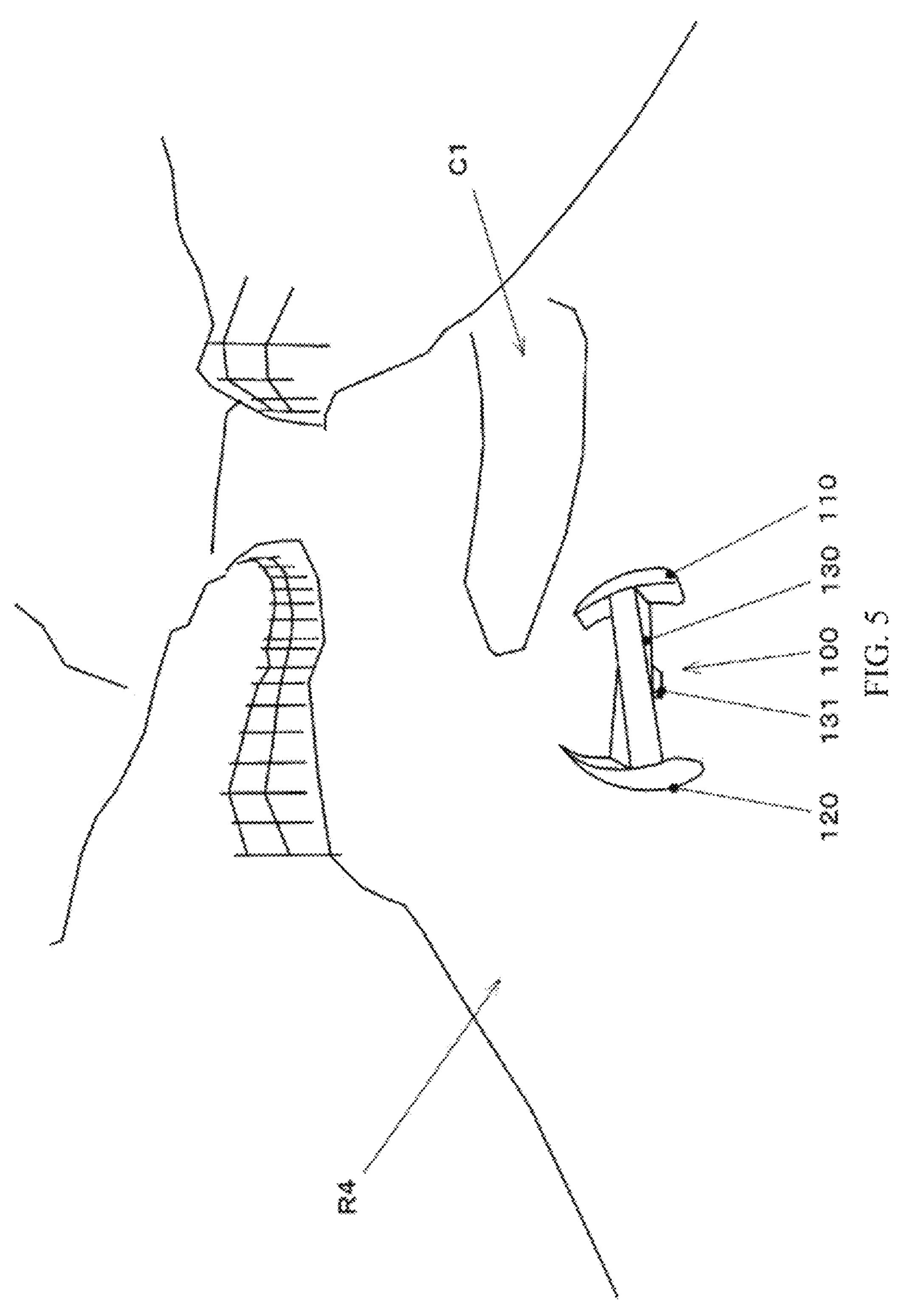
FIG. 5 is a diagram illustrating an example of a display mode of the head-up display when the vehicle travels on a road having a recess.

It should be noted that the steering wheel SW, the front screen FS, etc., are not illustrated in FIG. 3 to FIG. 5 for easier understanding.

In an example illustrated in FIG. 3, a road R2 in front of the vehicle may be a relatively narrow mountain road and the uphill road.

In this case, the three-dimensional object 100 may be so displayed in a state of being inclined (backward tilted) in a pitch direction, i.e., in the front-rear direction, that a front side of the three-dimensional object 100 is raised with respect to a rear side of the three-dimensional object 100.

A backward tilt angle of the three-dimensional object 100 may increase in accordance with an increase in a slope of the uphill road in front of the vehicle.

FIG. 4 is a diagram illustrating a display mode of the head-up display 31 when the vehicle travels on a bank road.

In an example illustrated in FIG. 4, a road R3 in front of the vehicle may have a single-sided slope or a cant in which a road shoulder on the left side is lower than a road shoulder on the right side.

The vehicle may roll to the left when the vehicle is to pass through the road R3.

In this case, the three-dimensional object 100 may be so displayed as to be inclined in the roll direction, i.e., in the right-left direction, that the left paddle 120 is lower than the right paddle 110. FIG. 5 is a diagram illustrating an example of a display mode of the head-up display 31 when the vehicle travels on a road having a recess.

In an example illustrated in FIG. 5, a road R4 in front of the vehicle may have a recess C1 in the right half part of a traveling lane.

When a right front wheel is to pass through the recess C1, the vehicle may exhibit a pitch behavior in which a front side of the vehicle body is lowered while the vehicle rolls to the right side.

In this case, the three-dimensional object 100 may be so displayed that the right paddle 110 is turned and tilted forward with respect to the left paddle 120, and the three-dimensional object 100 is twisted.

When the driver is to be prompted to perform the shift-up operation or the shift-down operation in view of a situation of the road in front of the vehicle, the driver may be prompted to perform the shift-up operation or the shift-down operation by changing a display mode of the right paddle 110 or the left paddle 120 upon displaying of the three-dimensional object 100.

For example, when a road in front of the vehicle recognized by the environment recognizer 10 is a descending road and the slope is equal to or greater than a predetermined threshold, the driver may be prompted to perform the shift-down operation to improve an effect of a brake, such as an engine brake, by downshifting. In some embodiments, a display color of a paddle such as the left paddle 120 may be changed or blinking of a paddle such as the left paddle 120 may be performed to prompt the driver to perform the shift operation such as the shift-down operation.

The example embodiment described above may achieve at least one of the following example effects.

(1) The attitude of the vehicle predicted by the vehicle behavior predictor 20 is represented in the form of an image of the three-dimensional object 100 and the image is projected onto the front screen FS of the vehicle and displayed on the front screen FS. This configuration helps to allow the driver to intuitively recognize the attitude that the vehicle takes in the future without shifting the line of sight from a situation in front of the vehicle.

(2) In some embodiments, the three-dimensional object 100 may have a shape that simulates the shift operation paddle by which the occupant of the vehicle performs the shift operation. This configuration helps to effectively achieve the example effect described above.

Alternatively or in addition, changing the display mode of the left paddle or the right paddle helps to prompt the driver to perform the shift operation.

(3) In some embodiments, the image generator 30 may be configured to represent, by the twisting of the three-dimensional object 100, a situation in which a local unevenness exists in one of locations through which the right wheels or the left right wheels of the vehicle pass when the vehicle is to pass through a road surface having a shape. This configuration helps to allow the driver to intuitively recognize the attitude that the vehicle takes in the future.

(4) In some embodiments, the image generator 30 may be configured to represent, by an inclination of the three-dimensional object 100 in the pitch direction, the tilt of the vehicle body in the pitch direction which is at the time when the vehicle is to pass through a road surface having a shape. This configuration helps to allow the driver to intuitively recognize the attitude that the vehicle takes in the future.

(5) In some embodiments, the image generator 30 may be configured to represent, by an inclination of the three-dimensional object 100 in the roll direction, the tilt of the vehicle body in the roll direction which is at the time when the vehicle is to pass through a road surface having a shape. This configuration helps to allow the driver to intuitively recognize the attitude that the vehicle takes in the future.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Modification Example 1

A configuration and an operation of the information presentation apparatus are not limited to the above-described example embodiment, and may be changed as appropriate.

Modification Example 2

In the example embodiment, the image of the three-dimensional object to be presented to the occupant may have a shape that simulates a driving operation member such as the shift operation paddle; however, the disclosure is not limited thereto. In some embodiments, a three-dimensional object of any other member or configuration may be displayed.

For example, the three-dimensional object may be a driving operation member other than the shift operation member. Alternatively, the three-dimensional object may have any three-dimensional shape unrelated to the driving operation member.

According to at least one embodiment of the disclosure, it is possible to provide an information presentation apparatus that makes it possible for an occupant to intuitively recognize an attitude that a vehicle takes in the future.

One or more of the environment recognizer 10, the vehicle behavior predictor 20, and the image generator 30 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of one or more of the environment recognizer 10, the vehicle behavior predictor 20, and the image generator 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the environment recognizer 10, the vehicle behavior predictor 20, and the image generator 30 illustrated in FIG. 1.

The invention claimed is:

1. An information presentation apparatus to be mounted on a vehicle, the information presentation apparatus comprising:

a road surface shape recognizer coupled to a sensor configured to monitor an area in front of the vehicle, the road surface shape recognizer being configured to recognize, in three dimensions, a shape of a road surface in front of the vehicle based on data acquired from the sensor;

a vehicle attitude predictor configured to predict a vehicle body behavior of the vehicle when the vehicle passes over the road surface in front of the vehicle, based on the shape of the road surface recognized in three dimensions by the road surface shape recognizer, the shape of the road surface including at least one of a curvature in a planar shape, an inclination of the road surface in a right-left direction, or an inclination of the road surface in a front-rear direction, the vehicle body behavior being at least one of: (i) a tilt of a vehicle body of the vehicle in a pitch direction, or (ii) a tilt of the vehicle body of the vehicle in a roll direction; and an image display configured to project an image of a three-dimensional object that represents the vehicle body behavior predicted by the vehicle attitude predictor onto a front screen of the vehicle and display the image on the front screen.

2. The information presentation apparatus according to claim 1, wherein the three-dimensional object has a shape that simulates a shift operation paddle by which an occupant of the vehicle performs a shift operation.

3. The information presentation apparatus according to claim 2, wherein the image display is configured to represent, by twisting of the three-dimensional object, the vehicle body behavior when a local unevenness exists at a location through which a right wheel or a left wheel of the vehicle passes when the vehicle passes over the road surface.

4. The information presentation apparatus according to claim 2, wherein the image display is configured to represent, by an inclination of the three-dimensional object in a pitch direction, a tilt of a vehicle body of the vehicle in the pitch direction when the vehicle passes over the road surface.

5. The information presentation apparatus according to claim 2, wherein the image display is configured to represent, by an inclination of the three-dimensional object in a roll direction, a tilt of a vehicle body of the vehicle in the roll direction when the vehicle passes over the road surface.

6. The information presentation apparatus according to claim 2, wherein the three-dimensional object includes a right paddle, a left paddle, a coupler coupling the right paddle and the left paddle, and a protrusion provided at a middle part of the coupler in a vehicle width direction.

7. The information presentation apparatus according to claim 6, wherein the image display is configured to change a display mode of the right paddle or the left paddle to prompt a driver of the vehicle to perform a shift operation.

8. The information presentation apparatus according to claim 7, wherein, when a road in front of the vehicle is a descending road and a slope of the descending road is equal to or greater than a predetermined threshold, the image display is configured to change a display color of the left paddle or cause the left paddle to blink to prompt the driver to perform a shift-down operation.

9. The information presentation apparatus according to claim 6, wherein, when the predicted vehicle body behavior includes the vehicle body tilting to a right side and the vehicle body tilting toward a front side due to only a right front wheel of the vehicle passing through a recess included in the shape of the road surface, the image display is configured to display the three-dimensional object such that the right paddle rotates in a forward-tilting direction relative to the left paddle and the coupler is deformed so as to be twisted.

10. The information presentation apparatus according to claim 1, wherein the image display is configured to represent, by twisting of the three-dimensional object, the vehicle body behavior when a local unevenness exists at a location through which a right wheel or a left wheel of the vehicle passes when the vehicle passes over the road surface.

11. The information presentation apparatus according to claim 1, wherein the image display is configured to represent, by an inclination of the three-dimensional object in a pitch direction, a tilt of a vehicle body of the vehicle in the pitch direction when the vehicle passes over the road surface.

12. The information presentation apparatus according to claim 1, wherein the image display is configured to represent, by an inclination of the three-dimensional object in a roll direction, a tilt of a vehicle body of the vehicle in the roll direction when the vehicle passes over the road surface.

13. An information presentation apparatus to be mounted on a vehicle, the information presentation apparatus comprising:

a sensor configured to acquire data in front of the vehicle;

circuitry configured to generate an image, based on the data acquired by the sensor; and a projector configured to project the image onto a front screen of the vehicle and display the image on the front screen, wherein the circuitry is configured to:

recognize, in three dimensions, a shape of a road surface in front of the vehicle, based on the data;

predict a vehicle body behavior of the vehicle when the vehicle passes over the road surface, based on the shape of the road surface in front of the vehicle recognized in three dimensions, the shape of the road surface including at least one of a curvature in a planar shape, an inclination of the road surface in a right-left direction, or an inclination of the road surface in a front-rear direction, the vehicle body behavior being at least one of: (i) a tilt of a vehicle body of the vehicle in a pitch direction, or (ii) a tilt of the vehicle body of the vehicle in a roll direction based on data acquired from the sensor;

generate an image of a three-dimensional object that represents the vehicle body behavior predicted by the circuitry; and output the generated image to the projector.

14. The information presentation apparatus according to claim 13, wherein the three-dimensional object includes a right paddle, a left paddle, a coupler coupling the right paddle and the left paddle, and a protrusion provided at a middle part of the coupler in a vehicle width direction.

15. The information presentation apparatus according to claim 14, wherein the circuitry is configured to generate the image such that a display mode of the right paddle or the left paddle is changed to prompt a driver of the vehicle to perform a shift operation.

16. The information presentation apparatus according to claim 15, wherein, when a road in front of the vehicle recognized by the circuitry is a descending road and a slope of the descending road is equal to or greater than a predetermined threshold, the circuitry is configured to generate the image such that a display color of the left paddle is changed or the left paddle blinks to prompt the driver of the vehicle to perform a shift-down operation.

17. The information presentation apparatus according to claim 14, wherein, when the predicted vehicle body behavior includes the vehicle body tilting to a right side and the vehicle body tilting toward a front side due to only a right front wheel of the vehicle passing through a recess included in the shape of the road surface, the circuitry is configured to display the three-dimensional object such that the right paddle rotates in a forward-tilting direction relative to the left paddle and the coupler is deformed so as to be twisted.

* * * * *